(12) United States Patent
Verhoeven et al.

(10) Patent No.: US 12,488,296 B2
(45) Date of Patent: Dec. 2, 2025

(54) TASK PERFORMANCE BASED ON LOCATION

(71) Applicant: NXP B.V., Endhoven (NL)

(72) Inventors: Henri Verhoeven, Someren (NL); Edwin Schapendonk, Oss (NL); Matheus Johannus Gerardus Lammers, Nederweert (NL); Oswald Moonen, Eindhoven (NL); Klaas Brink, Waalre (NL)

(73) Assignee: NXP B.V., Eindhoven (NL)

( * ) Notice: Subject to any disclaimer, the term of this patent is extended or adjusted under 35 U.S.C. 154(b) by 439 days.

(21) Appl. No.: 17/990,100

(22) Filed: Nov. 18, 2022

(65) Prior Publication Data
US 2024/0169284 A1    May 23, 2024

(51) Int. Cl.
*H04W 4/00*    (2018.01)
*G06Q 10/0631*    (2023.01)
*H04W 4/029*    (2018.01)
*H04W 4/08*    (2009.01)

(52) U.S. Cl.
CPC .... *G06Q 10/063114* (2013.01); *H04W 4/029* (2018.02); *H04W 4/08* (2013.01)

(58) Field of Classification Search
CPC ... G06Q 10/063114; H04W 4/02; H04W 4/08
See application file for complete search history.

(56) References Cited

U.S. PATENT DOCUMENTS

| | | | |
|---|---|---|---|
| 9,474,137 B1 | 10/2016 | Wein | |
| 2012/0026075 A1 | 2/2012 | Yu et al. | |
| 2014/0273811 A1* | 9/2014 | Czapla | H04M 1/72415 455/3.06 |
| 2015/0012308 A1* | 1/2015 | Snyder | G06Q 10/02 705/5 |
| 2017/0303646 A1* | 10/2017 | Bricken | G06F 1/163 |

FOREIGN PATENT DOCUMENTS

| | | | | |
|---|---|---|---|---|
| AU | 2007329622 B2 * | 6/2011 | | G01S 5/0036 |
| CN | 111710037 A | 9/2020 | | |

* cited by examiner

*Primary Examiner* — Erika A Washington

(57) ABSTRACT

A task performance system and method including multiple transmitters and multiple task devices distributed in a local area. Each task device includes communication circuitry, a memory, a controller, and output circuitry. The communication circuitry receives timing information and position information from the transmitters. The transmitters may also transmit task information including task location parameters that define the task area. The task area is divided into subblocks each having a corresponding task value. The controller uses the received information to determine its location and accesses the memory when located within the task area to retrieve a corresponding task value based on subblock location. The task information includes task values which may define a different task for each subblock. The controller activates output circuitry in accordance with the task value to perform a corresponding task. The output circuitry may include one or more light sources, a speaker, a vibration device, etc.

22 Claims, 6 Drawing Sheets

TASK PERFORMANCE BASED ON LOCATION

BACKGROUND

Field of the Invention

The present invention relates in general to performing tasks based on location, and more particularly to a task performance system including task devices that determine their relative location and that performs a corresponding task based on the determined location.

Description of the Related Art

Several methods are known for displaying images in a crowd of people. One manual method is to distribute colored boards or placards or the like to strategic locations, such as a range of stadium seats or the like, with instructions for patrons to physically hold the placards up at a predetermined time so that the collective placards form an image when viewed from a distance. Such manual method requires strategic collaboration by a large group of patrons, which often proves difficult and unreliable causing obvious anomalies in the actual displayed image at the selected time of display. An active method is distribution of wristbands or the like containing multi-colored light-emitting diodes (LEDs) or the like that are strategically illuminated at selected times. Again, strategic collaboration by the large group of patrons is often challenging since there is little control or coordination regarding location of the individual patrons.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
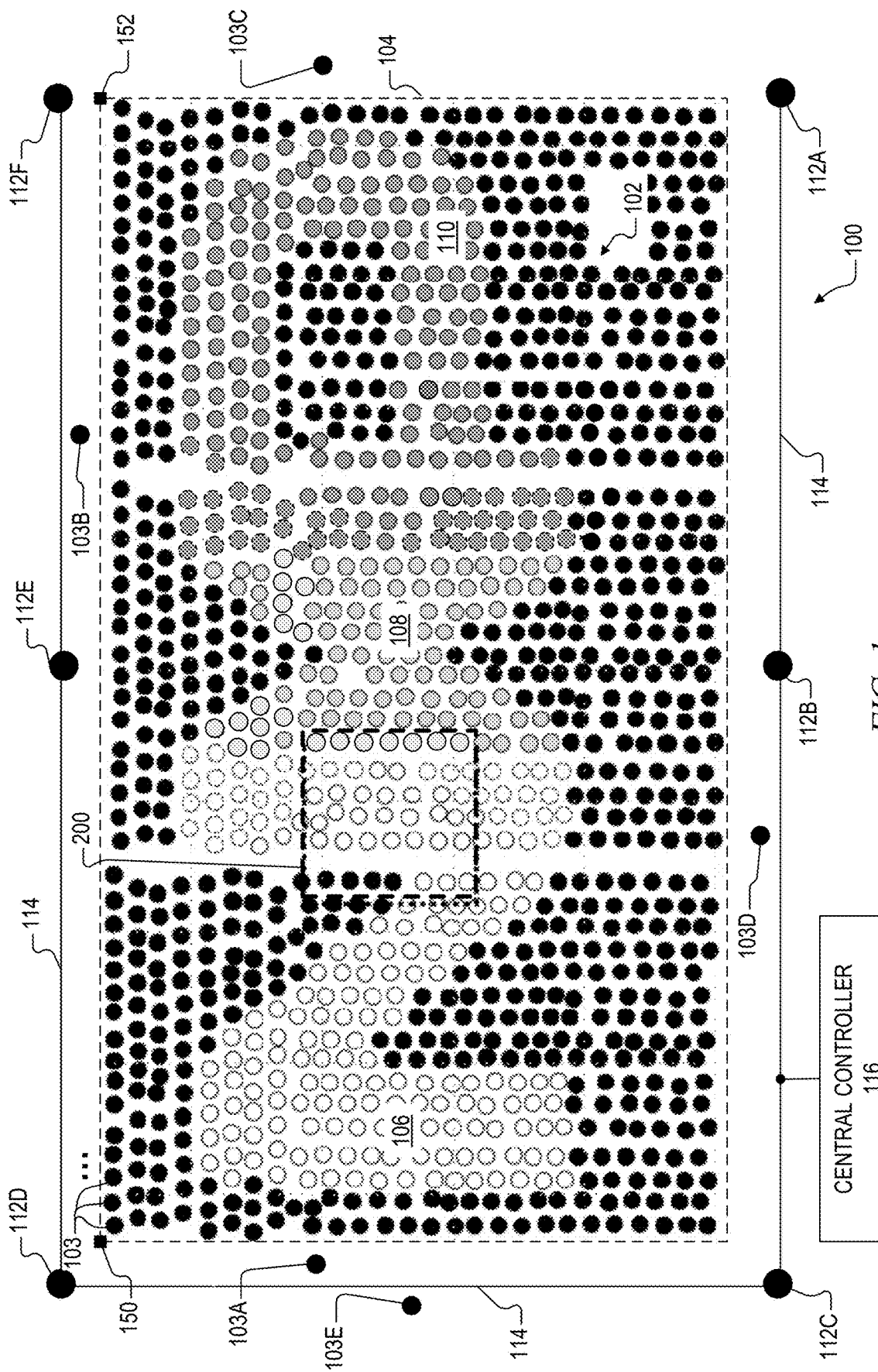
FIG. 1 is a simplified diagram of task performance system implemented according to one embodiment provided in a local area and configured to display a graphic image within a display area using light sources provided on each of multiple task devices.

A task performance system and corresponding task device is disclosed in which each task device determines its location, determines whether located in a task area, and performs a task based on the location when located in the task area. Each task device includes communication circuitry, a memory, a controller, and output circuitry that determines its location and that performs a selected task based on the determined location. The communication circuitry operates as receive-only to periodically receive timing information and position information that is used by the task device for determining its location in a local area. Transmitters distributed in the local area periodically transmit the timing information in the form of timestamps and the position information identifying positions of the transmitters within the local area. The memory stores task information including task location parameters that define a task area which includes an array of subblocks and corresponding task values. The task information may be pre-stored or may be transmitted by the transmitters and stored in the memory. The task device determines whether it is located in the task area of the local area, and if so, identifies a corresponding subblock of the task area to access a task value that corresponds with the identified subblock location. The task value determines the tasks to be performed, in which the task value is used to activate one or more output devices of the output circuitry, such as illuminating a light source, making a sound, vibrating the task device, etc.

The task performance system includes the transmitters distributed in a local area for periodically transmitting the timing information in the form of timestamps and the position information identifying positions of the transmitters. The local area may be a local venue or the like, such as a stadium or an arena or a large field or the like, in which crowds gather for viewing an event such as a concert or a sporting event or the like. The task performance system includes multiple task devices, each configured to receive and use the timing information and the position information to determine a location, to determine whether located in a task area, and to perform a task based on the location when located in the task area.

The location method may be trilateration or triangulation or the like that is performed on a periodic basis to update the location and corresponding task(s) to be performed. In one embodiment, the task information may define a graphic image to be displayed by a multitude of task devices located in the task area, in which the tasks include illuminating one or more light-emitting diodes at a selected intensity based on location. Other tasks may be performed, such as making sounds or vibrating the task device or the like. Many other tasks are contemplated for many different types of applications, such as performing work (e.g., vacuuming, mowing, etc.) based on the determined location of the task device. The memory may further store map information, either pre-stored or transmitted by the transmitters, in which the map information may be used to facilitate navigation in the area, such as a local venue or the like.

FIG. 1 is a simplified diagram of task performance system 100 implemented according to one embodiment provided in a local area and configured to display a graphic image 102 within a display area 104 using light sources provided on each of multiple task devices 103. Each task device 103 is held by, worn by, or otherwise provided on each patron of a crowd of patrons, such as, for example, a wristband, a hat, a visor, an article of clothing, etc. The crowd may be gathered in the local area or venue or the like, such as a stadium or an arena or a field or the like, for viewing an event such as a concert or sporting event or the like. The display area 104 is outlined by a dashed line defined within the venue for displaying the graphic image 102 as further described herein. The display area 104 is just one example of a task area which is an area for performing selected tasks as further described herein. The display area 104 is a task area specifically for displaying an image or the like, such as the graphic image 102. The illustrated graphic image 102 is a logo for NXP Semiconductors including stylized letters "N", "X", and "P" with adjacent letters partially merged together. Each patron may be a person, but may also be an animal or even an inanimate mobile object such as a robotic device or the like. Each task device 103 may have any suitable configuration, such as a wristband, a hat, a visor, an article of clothing, or clothing attachment, or a device which is configured to be pinned or mounted or attached to a person or to an article of clothing or object carried by a person (e.g., purse or bag or the like), and is equipped with a task circuitry 400 (FIG. 4) implemented according to an embodiment as further described herein.

Each task device 103 is depicted as a circular symbol with corresponding line style and shading representing activation status and when activated, a corresponding color or the like. Each circular symbol identifying a corresponding task device 103 located within the display area 104 represents a picture element or "pixel" of the overall graphic image 102, in which the collective set of pixels are intended to display the graphic image 102 when viewed at a distance, such as from an opposing side of a stadium or from an aerial view or the like. Although the circular symbols depicting each of the task devices 103 and corresponding pixels may appear at times to align according to an orthogonal pattern, such as aligned in rows and columns or the like, such alignment is not necessary. Instead, the patrons are free to move or roam within the display area 104 without having a substantial negative impact on the graphic image 102 being displayed by the collection of task devices 103 other than possible movement of pixels within a confined locality. The patrons may also move outside the display area 104 without negatively impacting the graphic image 102 being displayed so long as a sufficient number of patrons are located within the graphic area 104.

In a conventional manual crowd display method, the display area 104 could be mapped onto a predetermined grid of rows and columns, such as formed by individual seats of a stadium. Physical colored boards or placards may be distributed among the rows and columns of seats for manual display by the patrons seated in the particular grid of interest. The patrons would manually hold up the colored boards when prompted to collectively display a pre-designed graphic from a distance, such as from the opposing side of the stadium or from an aerial position. Such manual method requires strategic collaboration by a large group of patrons, which often proves difficult and unreliable causing obvious anomalies in the actual displayed image at a selected time of display. Alternatively, lights may be mounted on the seats themselves, which limits movement of patrons occupying those seats and may limit the image to the particular arrangement of the seats. In addition, many venues do not have a fixed arrangement of seat or have no seats at all.

The display area 104 depicted in FIG. 1 may also be mapped onto a predefined grid, such as seats in a stadium or the like, but such specific coordination among the patrons is unnecessary. Instead, as noted above, the display area 104 may be a free-space area in which patrons are allowed to freely move about the venue including the display area 104. In addition, instead of physical placards or boards or the like, the patrons carry with them a corresponding one of the task devices 103 equipped with the task circuitry 400. Each task device 103 equipped with a task circuitry 400 essentially serves as a pixel of the overall graphic image 102. Each task device 103 displays one or more lights with selected characteristics depending upon its location, which may be changed over time. Each task circuitry 400, therefore, is configured to determine its location within the display area 104 and to correspondingly select and illuminate a desired color at a selected intensity level that may be selected for that location.

As an example, the color yellow may be selected for an area 106 for identifying the letter "N" of the "NXP" graphic image 102, in which the color yellow is represented by a white circle without shading. In addition, the color blue may be selected for another area 108 for identifying the letter "X", in which the color blue is represented by a circle with light grey shading. In addition, the color green may be selected for yet another area 110 for identifying the letter "P", in which the color green is represented by dark grey shading. Other colors and corresponding shading may be used for overlapping areas of the graphic image 102, each represented by a dashed line circle. A dashed line white circle is used to represent areas in which the "N" overlaps the "X", in which a different color may be selected for those areas in which N overlaps X. Also, a dashed line circle with dark grey shading is used to represent areas in which the "X" overlaps the "P", in which yet another different color may be selected for those areas in which X overlaps P. The intensity of each color may be selected suitable for the graphic image being displayed.

When a task device 103 is located in the display area 104, but not within the areas 106, 108, 110, or any of the overlapping areas of the graphic image 102, the task circuitry 400 of the corresponding task device 103 may be inactivated (e.g., turned off). In FIG. 1, such task devices are represented by a black circle for contrast. This includes task devices 103 located within the enclosed space of the graphic "P" and not within the area 110. The outlined display area 104 is used for purposes of illustration in which it is understood that many of the task devices may move outside the display area 104, such as illustrated by task devices 103A, 103B, 103C, 103D, and 103E, which are also depicted by black circles. The output devices of the task devices 103A, 103B, 103C, 103D, and 103E are inactivated or turned off.

When a task device 103 moves into the area 106, the task circuitry 400 illuminates yellow. Assuming, for the moment, that the graphic image 102 is static, the task circuitry 400 remains illuminated yellow while the task device 103 is located anywhere within the area 106 for so long as the graphic image 102 is to be displayed. If the same task device 103 is moved from the area 106 into the area 108, the task circuitry 400 changes from yellow to illuminate blue, and again, assuming a static graphic image 102, stays illuminated blue while the task device 103 is located anywhere within the area 108 for so long as the graphic image 102 is to be displayed. The same is true if the task device 103 is moved from the blue area 108 to the green area 110, in which the task circuitry 400 changes from blue to green. In this manner, the overall graphic image 102 remains relatively stable when viewed from a distance even though being displayed by task devices 103 representing pixels of the overall image provided on moving patrons.

In the immediately preceding example, the illustrated graphic image 102 is depicted as a static image. The graphic image 102 may be a still image but may also be a snapshot in time of a series of animated images which may change over time. For example, the colors may be changed, the intensity of illumination may be changed, the entire image may be changed to a new image at a selected time, a range of different images may be displayed in time slots to simulate animation, etc. In addition, the task circuitry 400 of each task device 103 may be equipped with other types of output devices described further herein for performing tasks other than light sources for displaying one or more images, such as a vibration device for vibrating the task device 103, a speaker for playing a sound, etc.

A set of transmitters 112, individually labeled 112A, 112B, 112D, 112C, 112E, and 112F, are shown distributed around the display area 104. Although six transmitters 112A-112F are shown, it is understood that any suitable number of transmitters 112 may be included and distributed in a strategic for transmitting information based on several factors, such as the size of area to be covered, the applicable communication method used and corresponding communication parameters, the level of accuracy desired, the number of position coordinates needed, etc. In one embodiment, the transmitters 112 may be stand-alone and may operate independently albeit synchronized in time with each other. In another embodiment as shown, the transmitters 112 may be communicatively coupled together via a communication link 114 to a central controller 116, in which the communication link 114 may be wired or wireless. Each of the transmitters 112 may be "anchored" or otherwise located at fixed positions within the local area or venue. Alternatively, the transmitters 112 may be mobile and may be moved from one static position to another over time. Regardless of whether the positions of the transmitters 112 are fixed or mobile, their positions are known and specified, such as at specified position coordinates. The position coordinates may be according to two-dimensional (2D) area, such as including X and Y coordinates. The position coordinates may alternatively be according to three-dimensional (3D) space, such as including X, Y, and Z coordinates. Although one or more of the transmitters 112 may be moved from one position to another, they are generally stationary during operation to enable each of the task devices 103 to determine its location.

If provided, the central controller 116 may be used to control and synchronize the transmitters 112 for transmitting information to the devices located nearby, such as including the task circuitry 400 of each of the task devices 103 located within the display area 104. Synchronization includes ensuring that each transmitter 112 is synchronized in time so that the timing of all of the transmitters 112 in a given location are coordinated with each other. In one embodiment as further described herein, each transmitter 112 may transmit timestamp information. Since independent clocks may drift relative to each other over time, the controller 116 may be configured to periodically synchronize the clocks of each of the transmitters 112 so that the timestamp information is coordinated. Although each of the transmitters 112 may be configured to transmit information asynchronously with respect to each other, in one embodiment they may be configured such that only one of the transmitters 112 transmits at a time. In a large venue area with distributed transmitters, a limited number of the transmitters 112 may transmit at the same time if sufficiently separated in distance to avoid any potential communication conflicts.

The information transmitted by each of the transmitters 112 may include timing information, transmitter position information, and task information along with other information depending upon the particular implementation. In one embodiment, for example, each of the transmitters 112 periodically transmits a series of messages. Each message may include timing information such as, for example, a timestamp indicating a time point in which the message was transmitted. Each message may include transmitter position information, such as transmitter position coordinates identifying an absolute location of the transmitter 112 that transmitted the message. In addition, or in the alternative, the position information may be in the form of identification information uniquely identifying one of the transmitters 112 in which the corresponding location of each of the transmitters 112 is known beforehand, such as being prestored in the memory of the task circuitry 400 of each task device 103. The task circuitry 400 of each of the task devices 103 detects the transmitted messages from multiple ones of the transmitters 112 and uses a triangulation method or a trilateration method the like for determining its relative location within the display area 104 as further described herein.

The information being transmitted by each of the transmitters 112 may include tasks that are to be performed depending upon location, in which the task information may include image information or other action information. Image information may be used for activating light sources, such as LEDs or the like at selected intensities for displaying an image, such as, for example, the graphic image 102. The image information may change over time, such as for displaying a set of images over a given period of time. The image information may include specific display information for each of multiple locations or location ranges within the display area 104. With reference to FIG. 1, for example, the display information identifies a first color to be displayed in the area 106, a second color to be displayed in the area 108, a third color to be displayed in the area 110, alternative colors to be displayed in overlapping areas within the graphic image 102 (e.g., N/X or X/P), and so on. Each displayed color may have a specified intensity or brightness. In one embodiment, the task information may include timing information for identifying specific time ranges or time windows for performing a specified task such as displaying a specified image. Alternatively, the central controller 116 may be tasked with updating the task information over time so that the task information may or may not include such timing information. The task information may define a particular task to be performed at specific locations or by all locations. The task information may include, for example, a sound action for generating a particular sound, a vibration action for causing the task device 103 to vibrate, etc.

The information being transmitted by each of the transmitters 112 may further include map information for assisting in navigation within a particular venue when in a map mode. The map information may include identifying locations of facilities or attractions within the venue, such as, for example, exits (including emergency exits), medical or first aid locations, toilets, concession stands, restaurants, bars, etc. The format of the map information may depend on the capabilities of the task circuitry 400 as further described herein.

Figure 2:
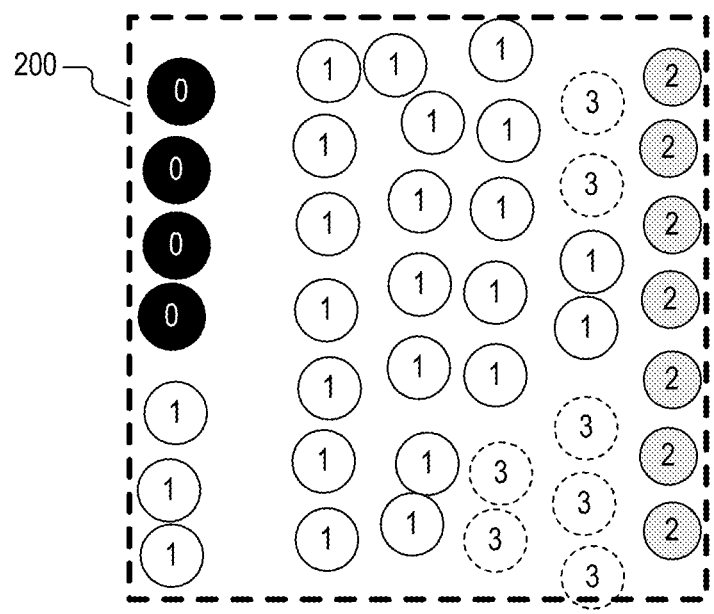
FIG. 2 is a close-up view of a square area shown in FIG. 1 with corresponding display designations for purposes of illustration.

FIG. 2 is a close-up view of a square area 200 shown in FIG. 1 with corresponding display designations for purposes of illustration. A black circle with the number "0" denotes an area outside the graphic image 102 representing a non-display or background area in which the task device 103 may be turned off (such as, for example, the task devices 103A, 103B, 103C, 103D, 103E). A white circle with the number "1" denotes the color yellow in the first area 106 for identifying the letter "N" of the graphic image 102. A grey-shaded circle with the number "2" denotes the color blue in the second area 108 for identifying the letter "X" of the graphic image 102. A dashed line white circle with the number "3" denotes an area in which N and X overlap within the graphic image 102, which may have a separate color used for contrast.

Figure 3:
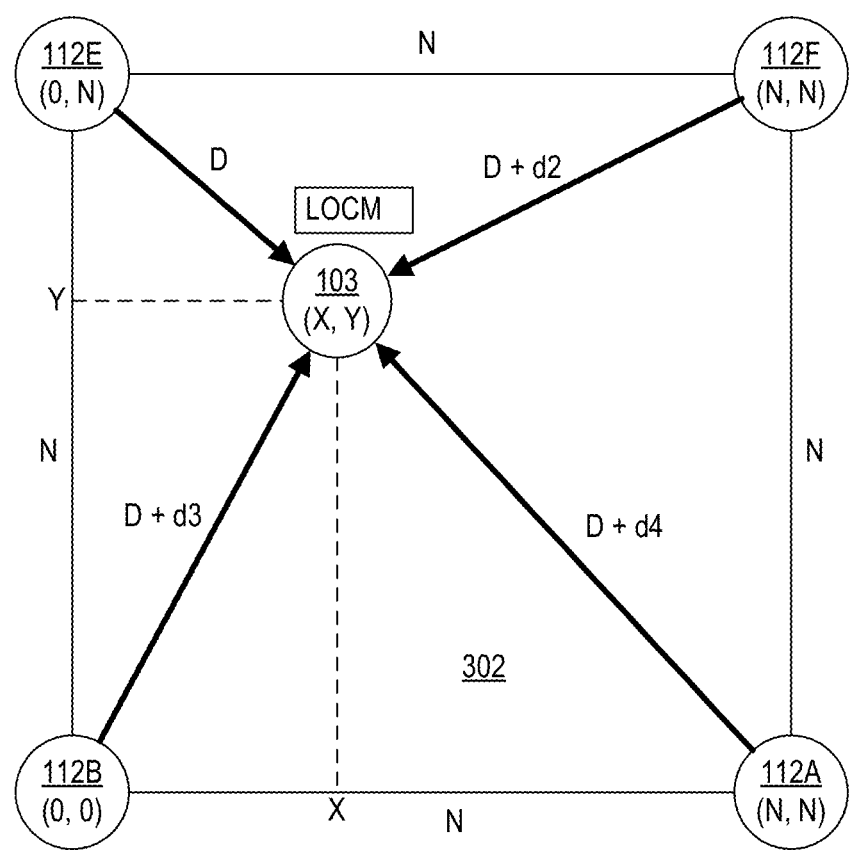
FIG. 3 is simplified block diagram illustrating a trilateration location method for determining the location of a task device of FIG. 1 equipped with the task device of FIG. 4 within an area surrounded or otherwise outlined by the transmitters according to one embodiment.

FIG. 3 is simplified block diagram illustrating a trilateration location method for determining the location of a task device 103 equipped with the task circuitry 400 within an area 302 surrounded or otherwise outlined by the transmitters 112A, 112B, 112E, and 112F according to one embodiment. It is noted that only 3 transmitters may be needed for identifying location in 2D space, whereas 4 transmitters may be needed for identifying location in 3D space using trilateration. Each of the transmitters 112A, 112B, 112E, and 112F are shown aligned in an X, Y plane and separated by a distance N. In this example, the transmitter 112B is located at an origin point (0, 0), the transmitter 112A is located along the X axis at a point (N, 0), the transmitter 112E is located along the Y axis at a point (N, 0), and the transmitter 112F is located at a corresponding diagonal point (N, N). Such specific alignment and precise separation by the transmitters 112 in general, including the transmitters 112A, 112B, 112E, and 112F shown in FIG. 3, is not necessary for an actual configuration and is only used for simplicity and clarity of illustration and discussion.

Each of the transmitters 112A, 112B, 112E, and 112F are configured to periodically transmit timing information and transmitter position information that enables the task device 103 equipped with the task circuitry 400 to determine its relative location. In one embodiment, the transmitters 112A, 112B, 112E, and 112F (and thus any of the transmitters 112) incorporate Ultra-Wideband (UWB) wireless transmitters and each task circuitry 400 includes a receiver (430, FIG. 4) which may be configured as UWB receiver. The transmitters 112 are synchronized with each other in time and periodically transmit messages with relatively precise timestamps and transmitter coordinate information or the like that uniquely identifies the position of the transmitter 112 that transmitted the signal. In one embodiment, the timing circuitry of the task circuitry 400 of each of the task devices 103 may be synchronized in time with the transmitters 112. In an alternative embodiment, the timing circuitry of the task circuitry 400 is not synchronized since location may be determined based on relative timestamp information and the position information.

In one embodiment, each message identifies the specific position point of the transmitter 112 within a predetermined range of accuracy. For example, the transmitter 112E transmits a message that includes data that identifies its position as (0, N) in 2D space. The task device 103 equipped with the task circuitry 400 receives the message with timestamp and transmitter position information from the transmitter 112E and determines that it is separated from the transmitter 112E by a distance D. The received timestamp may be used to determine a "flight time" or a relative flight time or the like of the transmitted message. In a similar manner within a short span of time, the task device 103 receives another message along with timestamp and transmitter position information from the transmitter 112F and determines that it is separated from the transmitter 112F by a distance D+d2, in which d2 is a delta distance amount relative to the distance D. In a similar manner within a short span of time, the task device 103 receives another message with timestamp and transmitter position information from the transmitter 112B and determines that it is separated from the transmitter 112B by a distance D+d3, and also within a short span of time receives another message with timestamp and transmitter position information from the transmitter 112A and determines that it is separated from the transmitter 112A by a distance D+d4. The messages from the transmitters may be received in any order.

In 2D space, the task circuitry 400 uses any three of these measurements and performs a trilateration method to determine its precise X, Y location within the area 402 for determining a location metric LOCM relative to a common reference point. Although not shown, all four of these measurements may be used by the task circuitry 400 to determine its precise X, Y, and Z location in 3D space, if desired, for determining LOCM. LOCM may be a combined digital value or the like, such as including a first digital value for the X coordinate, a second digital value for the Y coordinate, and a third digital value for the Z coordinate. The location metric LOCM may be relative to a common reference point, such as, for example, the origin position (0, 0). The task circuitry 400 continuously repeats this location process on a periodically basis to update LOCM over time, so that the task circuitry 400 has relatively accurate information about its location within a predetermined time deviation and within a predetermined distance deviation. Such predetermined deviations are selected to maintain an acceptable error for a given implementation. In one embodiment, for example, location may have an accuracy of about 50 centimeters with an update rate of about 100 milliseconds (ms) without movement or about 500 ms for position tracking when the task device 103 is moving.

Many variations are contemplated. The timestamp information may be based on absolute time or relative (e.g., delta) time. The transmitter position information may be based on one or more reference points, such as an origin point or the like (e.g., origin (0, 0) defining the position of the transmitter 112B). In addition or in the alternative, the transmitters 112 may transmit identification (ID) information which is used by the task circuitry 400 to convert to a corresponding known position using a prestored table or the like stored within a memory of the task circuitry 400. It is appreciated, however, that the specific position information provided by the transmitters 112 is sufficiently unique among the set of transmitters and is suitable to serve as both identification and location information, so that prestored information may be avoided.

Figure 4:
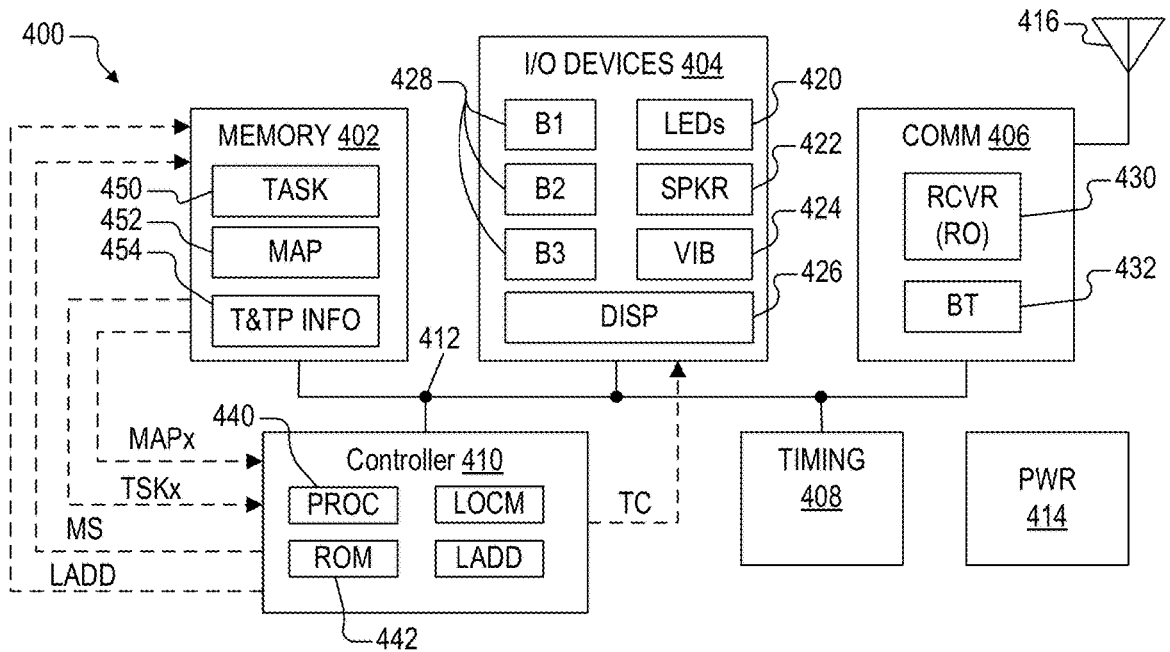
FIG. 4 is a simplified block diagram of the task circuitry implemented according to one embodiment which may be incorporated within each of the task devices of FIG. 1.

FIG. 4 is a simplified block diagram of the task circuitry 400 implemented according to one embodiment which may be incorporated within each of the task devices 103. The task circuitry 400 includes a memory 402, input/output (I/O) devices 404, communication (COMM) circuitry 406, timing circuitry 408, and a controller 410 coupled together with a suitable interface 412, such as a bus or the like. The task circuitry 400 may also include power (PWR) circuitry 414 for providing power to the circuitry of the task circuitry 400, and an antenna 416 for enabling wireless communications by the communication circuitry 406. The memory 402 may be implemented using any combination of random-access memory (RAM) and read-only memory (ROM) for storing data and code and any other information. The I/O devices 404 may include one or more output devices, such as, for example, a set of light-emitting diodes (LEDs) 420, a speaker (SPKR) 422, a vibration (VIB) device 424, a display (DISP) 426, etc.

The LEDs 420 may include any number of separate LED devices for displaying multiple colors at selected intensities. The I/O devices 404 may also include one or more input devices, such as, for example a set of buttons 428, individually shown as B1, B2, and B3. The buttons B1-B3 are exemplary only such that other types of input devices are contemplated, such as slide switches, rotary switches, on/off switches, etc. The timing circuitry 408 may include clock circuitry or the like for synchronizing local operations and for performing other local timing operations. The power circuitry 414 may include any type of local power source, such as a battery (which may or may not be rechargeable) for providing power to the circuitry of the task circuitry 400.

The communication circuitry 406 may include the receiver (RCVR) 430 which operates only as a receiver and thus is receive-only. The receiver 430 may be configured according to any type of wireless technology compatible with the transmitters 112. In one embodiment, for example, the receiver 430 is configured as a UWB receiver, although alternative types of wireless communication technologies are contemplated. A significant advantage of equipping each of the task devices 103 only as receive-only receivers for only receiving communications from the transmitters 112 is that wireless communications are minimized thereby avoiding data congestion particularly in crowded areas with a substantial number of task devices 103. In this manner, only the transmitters 112 wirelessly transmit timing and position information to the task devices 103 located in the local area including the task area. A substantial number of task devices 103 may be located in close proximity with each other such that bidirectional communications between each other or with the transmitters 112 may be prohibitive. Instead, one-way communications allow any number of task devices 103 to successfully receive information from the transmitters 112 and operate successfully in a very crowded area. In addition, one-way communications allow privacy to be maintained or even guaranteed.

If bidirectional communications with a local or near-by external device are desired, such as, a smart phone or the like, the communication circuitry 406 may include a Bluetooth (BT) transceiver 432 or the like. It is appreciated, however, that bidirectional communications should be limited and may tend to cause data congestion particularly in crowded areas. In addition, privacy may be compromised. The user of each task device 103 including the BT transceiver 432 has the choice of establishing bidirectional communications which may compromise privacy.

The controller 410 may be configured in any suitable manner for controlling operations of the task circuitry 400, such as processing (PROC) circuitry 440 and a ROM 442 and the like. The processing circuitry 440 may include or otherwise be any type of processor, such as a microcontroller or a central processing unit (CPU) or similar type circuitry. The ROM 442 may include preloaded code or software or the like executed by the processing circuitry 440 for controlling operations of the task circuitry 400. The controller 410 may also include, or otherwise have access to, one or more registers or the like for storing and periodically updating the location metric LOCM, among other possible values or parameters. The location metric LOCM may be a digital value or the like indicative of the immediate location of the corresponding task device 103 within an area, such as the display area 104, relative to a reference point.

The memory 402 may store task information 450 and map information 452. In one embodiment, one or both of the task information 450 and the map information 452 may be pre-stored. In another embodiment, the transmitted signals from the transmitters 112 includes messages that include either or both of the task information 450 and the map information 452 for storage into the memory 402, and such information may be updated from time to time as desired. The memory 402 may also be used for storing temporary data used for performing the location method, such as timing and transmitter position (T&TP) information 454 used by the controller 410 for determining and updating LOCM. The timing information may be in the form of timestamp information previously described.

In operation of the task circuitry 400, upon power-up or reset (POR), the receiver 430 begins detecting transmitted signals or messages or the like from nearby transmitters 112, such as the transmitters 112A-112F. The controller 410 may temporarily store timestamp information and other timing and position information as the T&TP information 454 in the memory 402 received from the communication circuitry 406 and perform the trilateration location method or other location methodology to determine relative location, which is used to determine and update LOCM. In this manner, the controller 410 may accurately track the specific location of the task device 103 with each new message from any of the transmitters 112. The timing information received from the transmitters 112, such as timestamp information or the like, may be used to update timing information of the timing circuitry 408. In one embodiment, for example, the timing circuitry 408 may include a real-time clock (RTC) circuit or the like.

Periodically, the controller 410 compares LOCM with any received task location parameters (TLP) 502 (FIG. 5), described further herein, for identifying the metes and bounds of any applicable task areas, such as, for example, the display area 104, to determine whether the corresponding task device 103 is within a task area identified by the task location parameters 502 provided within the task information 450. For example, task location parameters 502 are provided by the transmitters 112 that identify the location and size of the display area 104. When a task device 103 is located outside of a task area, such as the task devices 103A-103E located outside the display area 104, then the controller 410 turns off or otherwise deactivates the I/O devices 404. When a task device 103 is located within a task area, such as the task devices 103 located within the display area 104, then the controller 410 may use LOCM to determine a location address value LADD using the task location parameters, and then may apply LADD to the task information 450 stored in the memory 402 for retrieving a corresponding task value TSKx. In one embodiment, for example, the task information 450 within the memory 402 includes a lookup table (LUT) or the like in which each LADD value is mapped to a memory location storing a corresponding task value TSKx. The controller 410 then either applies TSKx to the I/O devices 404 directly, or otherwise controls the I/O devices 404 based on TSKx to perform a desired task, such as activating one or more LEDs at a specified color and specified intensity.

In one embodiment, the controller 410 converts TSKx to task control (TC) signals, which are applied to the I/O devices 404 for activating one or more output devices in accordance with the task value TSKx. Each task value, for example, may be provided in the form of a command or the like, which specifies a task, such as a color and corresponding intensity, and the controller 410 converts TSKx into the TC signals that activate one or more LEDs of the specified color and at the specified intensity. In another embodiment, TSKx may be suitable for direct application to the I/O devices 404, so that the task values are simply retrieved and applied by the controller 410 without further conversion.

As an example using the graphic image 102 of FIG. 1, when the controller 410 determines that a task device 103 is located within a display area 104, it converts LOCM to a corresponding LADD and applies LADD to task information 450 located in the memory 402. The memory 402 outputs a corresponding task value TSKx, which is converted to the TC signals applied to the I/O devices 404. Suppose, for example, that LADD maps to a pixel location within the area 106 of the graphic image 102. The retrieved task value TSKx indicates that the LEDs 420 are to be illuminated a specified color, such as yellow, at a specified intensity (e.g., high intensity), so that the I/O devices 404 activate the LEDs 420 for the specified color and intensity illumination while the task device 103 remains at or sufficiently near the same location.

In addition, the task circuitry 400 may operate in a map mode as further described herein. In the map mode, the controller 410 applies a map select (MS) to the MAP information 452 for selecting a map, in which a selected map MAPx is provided back to the controller 410. MAPx may be redirected to the I/O devices 404 for display on the display 426, or to the communication circuitry 406 and transmitted to an external device, such as a personal communication device 702 (FIG. 7), as further described herein.

Figure 5:
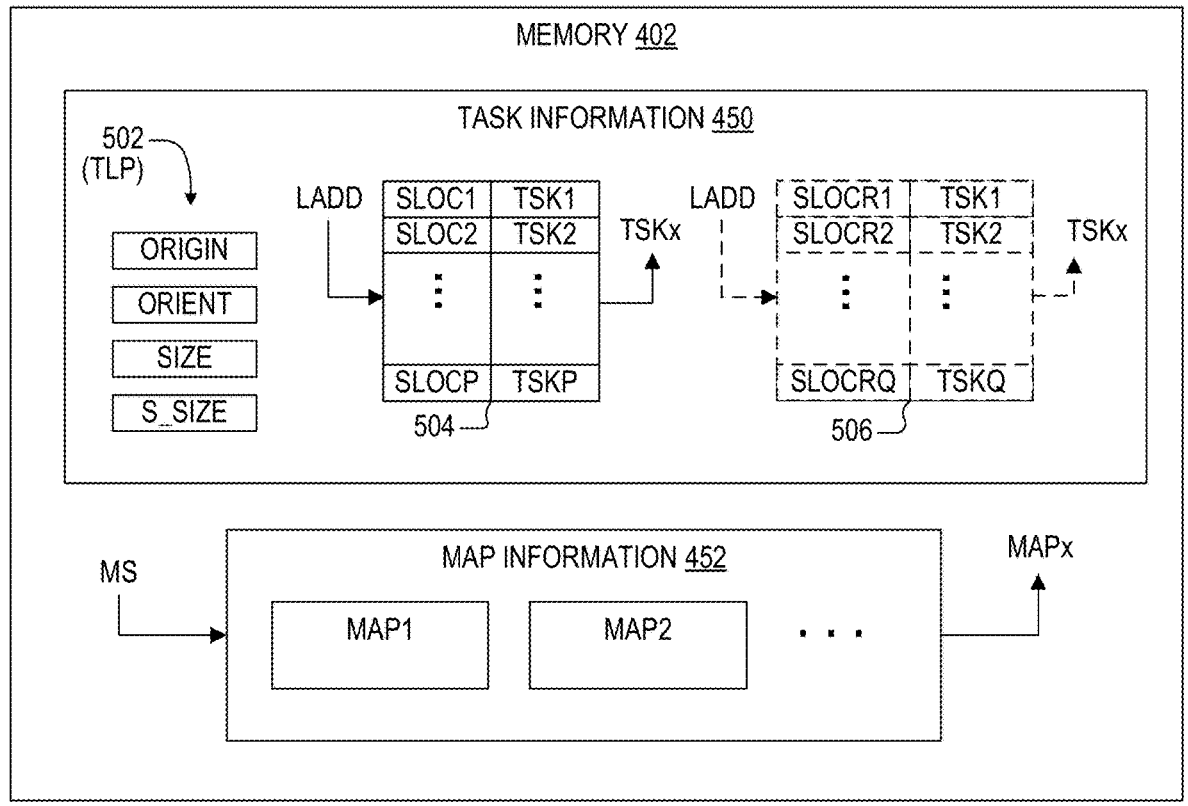
FIG. 5 is a simplified block diagram of the memory storing task information and map information according to one embodiment.

FIG. 5 is a simplified block diagram of the memory 402 storing task information 450 and map information 452 according to one embodiment. The task information 450 may include the task location parameters (TLP) 502 for specifying the parameters of a task area in which selected tasks are to be performed. The display area 104 in FIG. 1, for example, is a task area for displaying the graphic image 102. Many variations are possible for specifying a task area. In one embodiment as shown, for example, the TLP 502 may include an ORIGIN parameter that identifies an origin or "start" location of the task area. As shown in FIG. 1, for example, a square dot 150 identifies an origin or starting point of the display area 104. The ORIGIN may be specified as X, Y, Z coordinates identifying a starting point for a task area. The TLP 502 may also include an ORIENT parameter that identifies an orientation of the task area relative to the ORIGIN. The ORIENT parameter may be specified as an angular displacement of the task area. Alternatively, the ORIENT parameter may be specified as X, Y, Z coordinates identifying another point of the task area that represents the orientation relative to the ORIGIN. As shown in FIG. 1, for example, another square dot 152 identifies another endpoint of the display area 104 relative to the ORIGIN. The ORIENT parameter may include additional information for 3D areas or images.

The TLP 502 may also include a SIZE parameter that specifies the size of the task area. The SIZE parameter may be specified in any suitable manner. In one embodiment, for example, SIZE may indicate a number of subblocks of the task area, such as the number of pixels of a display area. As shown in FIG. 1, for example, the display area 104 may have a SIZE of 50 pixels in width and 27 pixels in length. For 3D areas or images, another value may be provided as a depth parameter, such as identifying a number of pixels in depth. The TLP 502 may include an S SIZE parameter indicating the relative size of each subblock. The graphic image 102 shown in FIG. 1, for example, may have a designated pixel size, such as, for example, a pixel size of about 100 cm by 100 cm. A 3D task area may include a depth parameter for each subblock or pixel.

The task information 450 may further include a task list 504 of task values (TSKx) based on one or more subblock location (SLOCx) values having locations and sizes based on the TLP 502. The task list 504 may be configured as a lookup table (LUT) or the like for accessing task information using LADD based on LOCM. The organization of the task list 504 is according to any suitable location based on the TLP 502. For example, a first row of subblock locations may be listed first, immediately followed by the second row and then the third row and so on to complete all rows and corresponding columns of the overall task area for a 2D task area. The information may be repeated as many times as necessary to complete depth information for a 3D task area. The controller 410 compares LOCM with the task area defined by the TLP 502 for determining whether the task device 103 is inside or outside the task area. If LOCM is not within the task area, then the controller 410 turns off the I/O devices 404. The controller 410 periodically updates LOCM and compares to the task area specified by the TLP 502 on a continuous basis. When the controller 410 determines that LOCM is within the task area, it converts LOCM to LADD based on the TLP 502 and applies LADD to the task list 504.

In the illustrated embodiment, the task list 504 stores a list of subblock location values SLOC1, SLOC2, . . . , SLOCP and corresponding task values TSK1, TSK2, . . . , TSKP for each specified subblock location, in which "P" is an integer that defines the total number of individual subblock locations. Each individual subblock location may correspond with a task to be performed when the task device 103 is at that location. Each subblock location, for example, may correspond with a pixel of an image to be displayed, in which the corresponding task value specifies an illumination color along with an illumination intensity for that color. As shown in FIG. 1, for example, when the task device 103 is located at any pixel location within the area 106 of the graphic image 102, the task value may specify the color yellow at high intensity.

As shown in FIG. 1, for example, when the task device 103 is located at any pixel location within the area 106, the corresponding task circuitry 400 illuminates one or more yellow LEDs at a specified intensity. As the patron roams within the area 106 and thus is located at any one of the local pixels contained within the area 106, the task circuitry 400 remains illuminated yellow at a specified intensity. If the patron wanders from the area 106 into any of the local pixels within the area 108, then the task circuitry 400 turns off the yellow LEDs and instead turns on one or more blue LEDs at a specified intensity, and so on. In this example for the graphic image 102, the task list may include a location value for each individual pixel of the graphic image 102 along with a corresponding task value specifying the color and corresponding intensity to be displayed at that location.

In the alternative, the task information 450 may include or may otherwise be stored as a range of subblock location values and corresponding task values. A task list 506, for example, is shown using dashed lines may store a list of subblock location ranges SLOCR1, SLOCR2, . . . , SLOCRQ and corresponding task values TSK1, TSK2, . . . , TSKQ for each specified location range, in which "Q" is an integer that defines the total number of individual subblock location ranges. A subblock location range may be specified as predetermined X, Y, and Z coordinate ranges, such as width, length, and height distance ranges within the specified area, or may be a range of pixel locations. A given area for displaying an image may again be subdivided into a plurality of individual pixel locations, in which a location range may define one or more pixels or groups of pixels within the overall display area. An area of an image, such as the area 106 of the graphic image 102, may be subdivided into multiple location ranges as a matter of convenience. Each location range may specify one or more pixels within a given column, one or more pixels within a given row, or a range of rows and columns, etc.

The central controller 116 may control each of the transmitters 112 to ultimately control each task circuitry 400 within each of the task devices 103 for controlling the display over time. For example, the central controller 116 may send task information for displaying the graphic image 102 as a first graphic image for a selected time period, in which each of the transmitters 112 transmit corresponding task information for displaying the graphic image 102. The task circuitry 400 of each of the task devices 102 located in the display area 104 receive and begin displaying the graphic image 102 as a first graphic image. Subsequently, the central controller 116 may send display information for displaying a second graphic image (not shown) for a subsequent time period, in which each of the transmitters 112 transmit corresponding location information for displaying the second graphic image. The task circuitry 400 of each of the task devices 102 located in the display area 104 receive and begin displaying the second graphic image rather than the first graphic image.

In one embodiment, each of the transmitters 112 transmit the same display information so that each task device 103 retrieves the same display information regardless of where located in the general area. The central controller 116 may also broadcast other display information, such as for turning off the display of each of the task devices or setting each task device to display a default or background color or the like. The central controller 116 may update the display information on a periodic basis for displaying moving images or graphics over time.

The task information contained within each task value TSKx may be tasks other than display information, such as, for example, a sound value applied to the speaker 422 for generating a particular sound or a vibration command applied to the vibration device 424 for causing the task device 103 to vibrate, either indefinitely or for a specified amount of time. When the task devices 103 are distributed in a crowd of patrons located in a given area, many different types of programmed effects may be generated. Although all of the task devices 103 may collectively emit the same sound or may vibrate at a selected time or synchronized with beats of music, such sound or vibration effects may also vary throughout the crowd any different times. For example, a vibration wave or a programmed sound may be generated among the group of task devices 103 starting at one side of the crowd and traveling to the other or starting from the middle moving out, etc. Any such tasks or effects may also be accompanied by synchronized waves of lights of various colors or the like.

The map information 452 may store one or more maps, shown as MAP1, MAP2, etc., of a given venue used by the patron for identifying locations of facilities or attractions within a given venue, such as, for example, exits (including emergency exits), medical or first aid locations, toilets, concession stands, restaurants, bars, etc. A single map of the entire venue is contemplated, although individual maps of smaller areas of a large venue may also be provided.

The map information 452 may be provided in a form for viewing on the display 426 if provided. The patron may use the input devices, such as by activating one or any predetermined activation of a combination of the buttons 428 to place the task device 103 into a map mode, in which the controller 410 then performs map services, such as by applying a map select signal based on LOCM to the map information 452 and a selected map MAPx is retrieved and displayed on the display 426, which may also identify the patron's relative location on the selected map. The displayed map and patron location may then be used by the patron to locate any nearby attractions.

It is appreciated that it may be desired to implement the task device 103 as inexpensively as possible or as simple as possible or configured to consume minimal energy. Thus, the inclusion of the display 426, even if rudimentary, and further the storing of viewable map information for display, may be considered too expensive or too complicated in terms of cost or power consumption in some configurations. The map information 452 stored as one or more maps MAPx may instead be applied by the controller 410 during map services to interactively communicate with the patron using the I/O devices 404, such as by controlling the LEDs 420, the speaker 422, or the vibration device 424 for navigation to guide the patron to a selected facility or attraction or the like within a local venue. As an example, the patron may use one or more of the buttons 428 to place the task device 103 in map mode for locating a selected area, such as a restroom, a concession stand, the nearest exit, etc. The LOCM compared with the selected map may be used to provide an indication to the patron of the correct direction. As the patron moves or waves their arm or the like, the task device 103 may illuminate a green light for the correct direction and a red light for the wrong direction. Similar functions may be performed by the speaker 422 (buzzer for wrong direction, bell for correction direction) or the vibration device 426 (soft vibration for correct direction and stronger vibration for wrong direction), etc.

In an alternative embodiment as further described herein, the map information 452 and the LOCM may be shared during map services with the personal communication device 702, such as a smart phone or augmented reality glasses or the like, via the BT transceiver 432, which operates software or an application or the like for purposes of navigation. For example, an application or software installed on the personal communication device 702 uses the map and position information retrieved from the task device 103 for directing the patron to a selected facility or other attraction. Alternatively, the map and location information may be shared with the cloud (via WiFi, 4G, 5G, etc.) in which the software assists in locating facilities or even other users.

Figure 6:
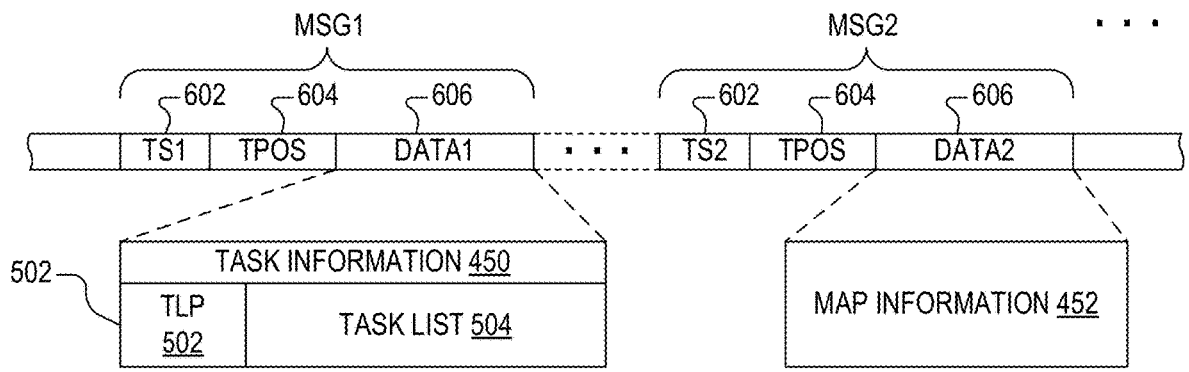
FIG. 6 is a simplified diagram illustrating exemplary transmissions that may be made by each of the transmitters of FIG. 1 according to one embodiment.

FIG. 6 is a simplified diagram illustrating exemplary transmissions that may be made by each of the transmitters 112 according to one embodiment. Each transmitter 112 may repeatedly or periodically transmit a series of messages over time, such as MSG1, MSG2, . . . as shown. Each message may include transmit timing information, such as a corresponding one of a series of timestamp (TS) values 602, individually shown as TS1 for MSG1, TS2 for MSG2, etc., in which each timestamp value may be absolute or relative. Each message may also include relative transmitter position (TPOS) values 604 identifying the position of the transmitter 112 transmitting the message, which may be used by the task circuitry 400 in conjunction with the timing information for determining its relative location as previously described. Each message may further include a data payload 606, such as DATA1 for MSG1, DATA2 for MSG2, and so on. The data payload 606 may include the task information and map information or other useful information transmitted periodically over time.

In the illustrated configuration, the data payload DATA1 of MSG1 includes the task information 450, which may include the TLP 502 and the corresponding task list 504 (or the task list 506) previously described. The controller 410 may retrieve and store the task information 450 into the memory 402 as shown in FIG. 5. The task circuitry 400 of each task device 103 may store the timestamp information 602 and transmitter location information TPOS 604 from multiple transmitters 112 as the T&TP information 454, and may store the received task information 450 from at least one of the transmitters for storage into its local memory 402. The T&TP information 454 may be used to perform the applicable location method to update its local location metric LOCM. The task circuitry 400 of each task device 103 may compare its LOCM value to the task area defined by the task information 450, and perform one or more corresponding tasks based on retrieved task values TSKx, such as turning on one or more LEDs, make corresponding sounds, cause the local task device 103 to vibrate, etc.

In the illustrated configuration, the data payload DATA2 of MSG2 includes the map information 452, which may retrieved and stored into the local memory 402. The controller 410 of a task circuitry 400 of a task device 103 placed into map mode retrieves a selected map MAPx using the MS signal for determining relative location of local attractions of the venue or facility as previously described. Each of the transmitters 112 may be configured to continuously transmit on a periodic basis messages including the timing information in the form of TS values 602 and position information in the form of TPOS values 604 to enable each of the task devices 450 to determine its location over time. In addition, all or any number of the messages may include data payloads 606 to provide and update the task information 450 and the map information 452 over time.

Figure 7:
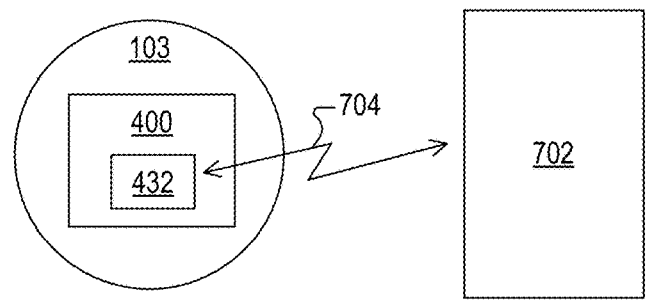
FIG. 7 is a simplified block diagram of the task device of FIG. 1 equipped with the task circuitry of FIG. 4 incorporating a Bluetooth transceiver or the like for wirelessly communicating with the external personal communication device according to one embodiment.

FIG. 7 is a simplified block diagram of the task device 103 equipped with the task circuitry 400 incorporating a Bluetooth transceiver 432 or the like for wirelessly communicating with the external personal communication device 702 according to one embodiment. The personal communication device 702 may be a smart phone or the like. A patron with the task device 103 and a personal communication device 702 may place the task circuitry 400 into a communication mode for linking to the personal communication device 702 for sharing information. The map information 452 and the LOCM of the task device 103, for example, may be shared with the personal communication device 702, which operates software or an application or the like for purposes of navigation. In one embodiment, an application or software installed on the personal communication device 702 receives and uses the map and location information retrieved from the task device 103 for directing the patron to a selected facility or other attraction. Alternatively, the map and location information may be shared with the cloud (via WiFi, 4G, 5G, etc.) in which the software assists in locating facilities or even other users.

In the illustrated embodiments, the communication between each of the transmitters 112 and the task circuitry 400 of each task device 103 is one-way, in which each transmitter 112 only transmits and each task circuitry 400 only receives. Such unidirectional wireless communication is advantageous in that traffic is minimized and network overload is avoided. In addition, privacy is maintained and may even be guaranteed. In this manner, if the task circuitry 400 of any given task device 103 is used only as a receiver without transmitting any information, privacy may be guaranteed.

The wireless communication between the task circuitry 400 and the personal communication device 702 is bidirectional, however, as depicted by a two headed arrow 704. When the task circuitry 400 includes a transceiver that is used for sharing location via the cloud, however, privacy is no longer guaranteed. In this manner once the task circuitry 400 of any given task device 103 shares information with an external device, such as the personal communication device 702, privacy may be compromised or at least no longer guaranteed.

Figure 8:
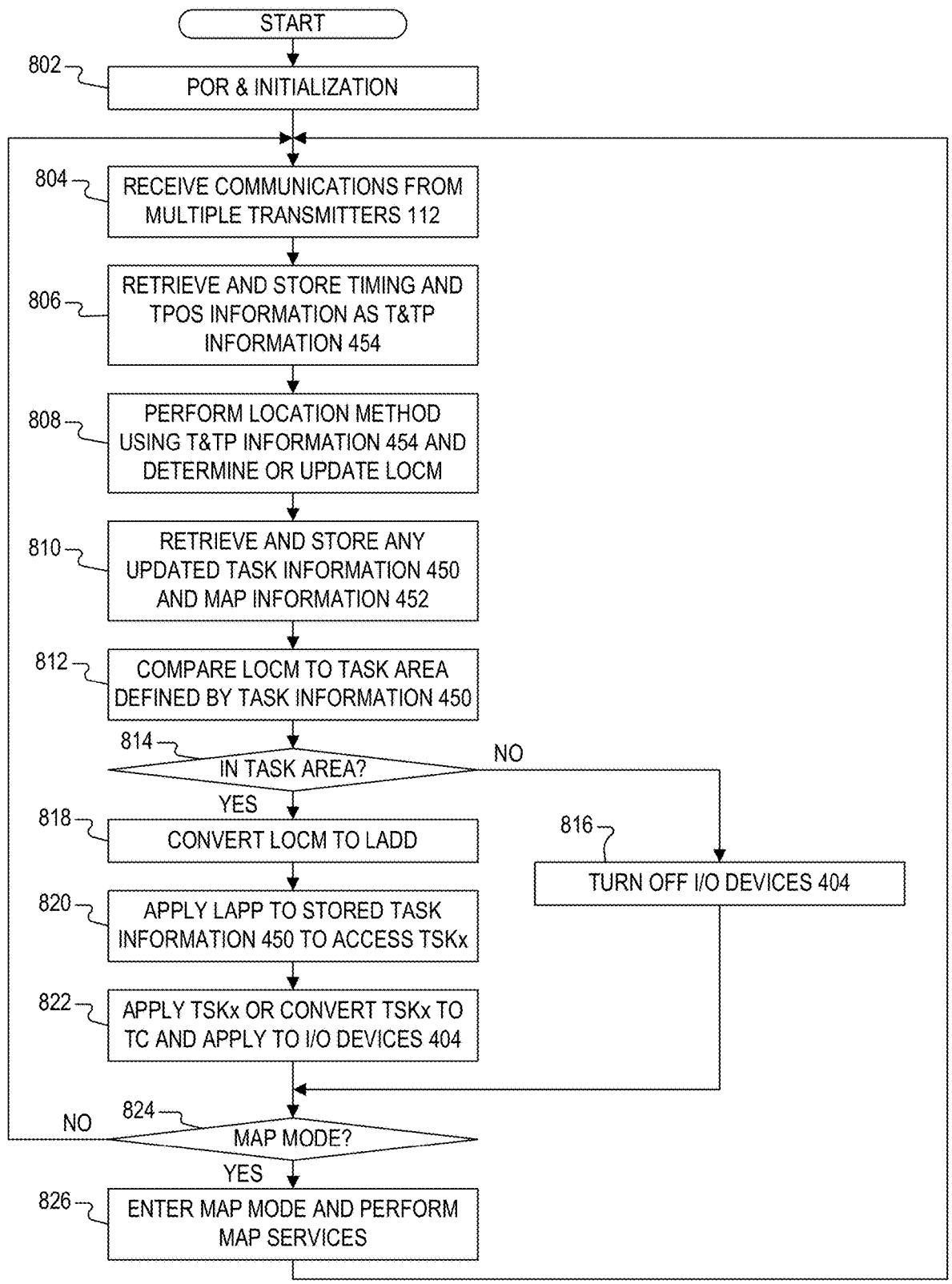
FIG. 8 is a flowchart diagram illustrating operation of the task device of FIG. 4 of each task device of FIG. 1 for receiving timing and position information and for determining location according to one embodiment.

FIG. 8 is a flowchart diagram illustrating operation of the task circuitry 400 of each task device 103 for receiving timing and position information and for determining location according to one embodiment. At a first block 802, a power-on reset (POR) operation including initialization may be first performed when the task device 103 is initially powered on or reset during operation. Operation advances to block 804 in which the task circuitry 400 receives communications from multiple transmitters 112, and then to block 806 in which it retrieves and stores timing and transmitter position information from the received communications as the T&TP information 454. The timing information may be in the form of timestamp information or the like as previously described. At next block 808, the controller 410 uses the T&TP information 454 to perform the applicable location method for determining the location of the task device 103, and the value of LOCM is updated. The location method may be a triangulation method or a trilateration method or the like. As previously described, the number of transmitters 112 used and strategic transmitter locations depends on whether the location information is determined in 2D space (requiring information from a minimum of 3 transmitters 112) or 3D space (requiring information from a minimum of 4 transmitters 112), along with other factors, such as the size of area to be covered, the applicable communication method used and corresponding communication parameters, the level of accuracy desired, etc.

At next block 810, any updated task information 450 and map information 452 may be retrieved from communications from one or more of the transmitters 112 and stored into the memory 402. It is noted that block 810 may be skipped or omitted for embodiments in which the task information is prestored and not updated. At next block 812, the controller 410 compares LOCM to the task area defined by the task information 450. At next block 814, it is queried whether the task device 103 is located within the task area. If not, operation proceeds to block 816 in which the I/O devices 404 are turned off. If the task device 103 is located within the task area as determined at block 814, operation instead advances to block 818 in which the controller 410 converts LOCM to an LADD value, and then to block 820 in which the LADD value is applied to the stored task information 450 to retrieve a corresponding TSKx value. At next block 822, the controller 410 applies TSKx or converts TSKx to TC and applies TC to the I/O devices 404 for activating one or more output devices in accordance with the task value TSKx. As previously described, such activation may include display (e.g., LEDs) or other tasks (e.g., sound, vibration).

After the I/O devices 404 are turned off at block 816, or after the I/O devices 404 are selectively activated at block 822, operation advances to next block 824 in which it is queried whether to enter map mode, such as when the user interfaces any one or more of the set of buttons 428 indicating the desired to enter map mode. If so, operation advances to block 826 in which the map mode is entered and the controller 410 performs map services as previously described. Such map services depend upon the particular application. Map services may include the controller 410 retrieving a stored map and displaying the retrieved map on the local display 426 along with an indication of corresponding location within the displayed map. In addition or in the alternative, the map services may include the controller 410 using the I/O devices 404 to interactively communicate with the patron to guide the patron to a selected attraction, such as a restroom or concession stand or the like. In addition or in the alternative, the map services may include the controller 410 using the communication circuitry 406 to communicate with the external personal communication device 702 for sharing retrieved map information and performing navigation services. If map mode is not entered as determined at block 824, or after map mode is entered and map services are initiated or otherwise performed, operation loops back to block 804 and operation may continuously loops while the task device 103 is powered on.

It is noted that the map services, once entered, may be performed in parallel with task performance operations. Thus, operation may continue to loop between blocks 804 and 826 while map services are active. Although not specifically shown, once map services are entered, they may be terminated by the user or simply ended by the task circuitry 400 when no longer being used.

Figure 9:
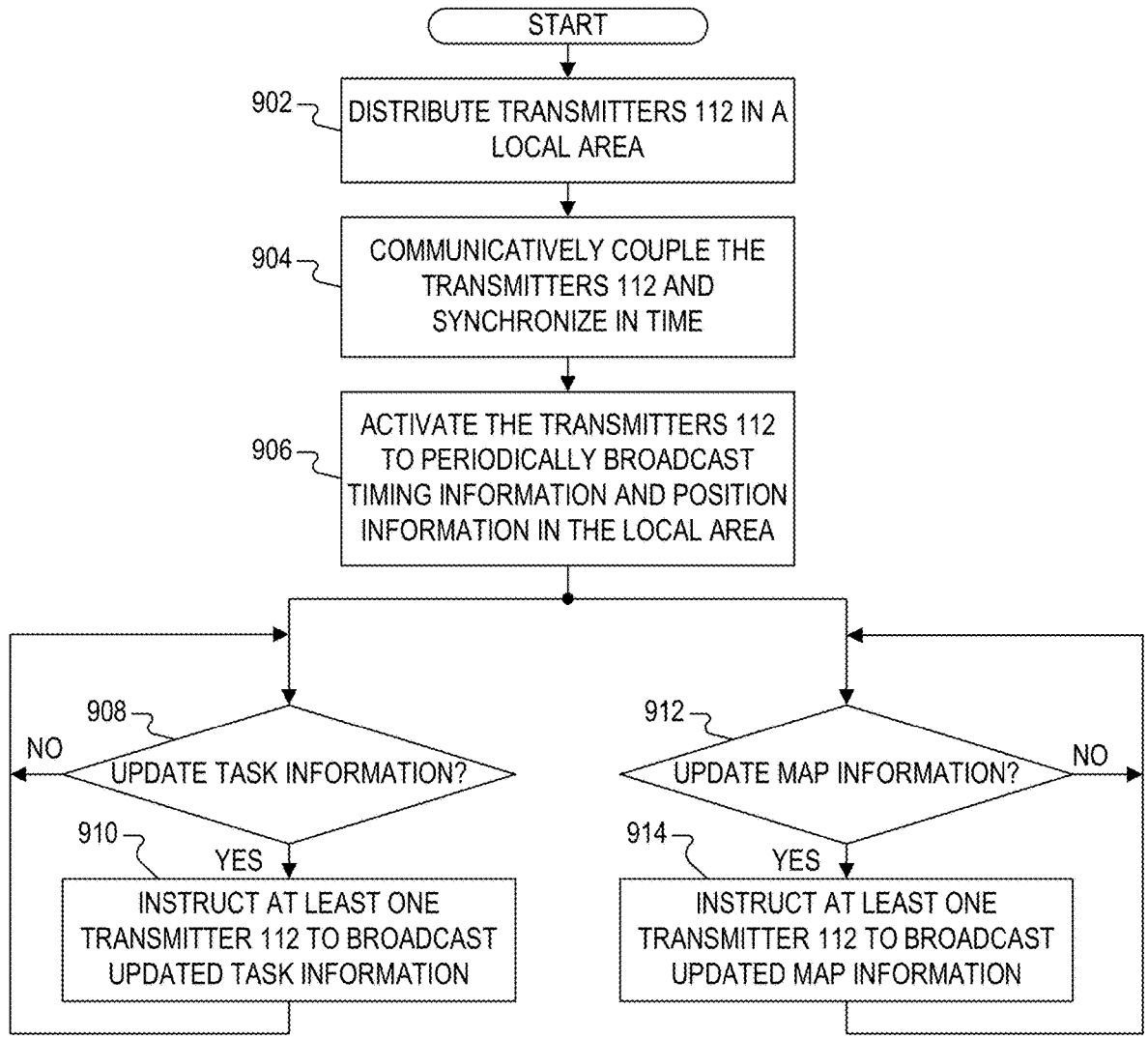
FIG. 9 is a flowchart diagram illustrating operation of a task performance system implemented according to one embodiment, such as including the task performance system of FIG. 1.

FIG. 9 is a flowchart diagram illustrating operation of a task performance system implemented according to one embodiment, such as including the task performance system 100. At a first block 902, the transmitters 112 are distributed in a local area, such as, for example, a venue, a stadium, an arena, a field etc., which may be suitable for viewing an event such as a concert or sporting event or the like. At next block 904, the distributed transmitters 112 are communicatively coupled together and synchronized in time. The transmitters 112 may be communicatively coupled using wired or wireless communications, in which control may be distributed among the transmitters 112 or centralized, such as by coupling the central controller 116. Centralized or distributed control enables an operator or the like to coordinate tasks or functions performed by multiple task devices 103 distributed in the local area and within communication reception of transmissions by the transmitters 112.

At next block 906, the transmitters 112 are activated to periodically broadcast timing information and position information in the local area. The timing information may be in the form of timestamps as previously described. The position information may be in the form of X, Y or X, Y, Z coordinates of the broadcasting transmitter. Such broadcasted information enables each local task device 103 to at least perform a location method, such as trilateration or triangulation or the like, to determine its location within the local area. Once activated or turned on, each task device 103 within the local area performs the location method to determine its location. In one embodiment as previously described, the task devices 103 may include prestored task information including the TLP 502 identifying a task area (e.g., display area 104) and at least one task list 504 or 506. If the task information is prestored, then those task devices 103 located within the task area may begin performing tasks specified in the prestored task list(s) without further input from the transmitters 112.

Operation may then proceed from block 906 to block 908 in which it is queried whether to update task information. If not, operation loops back to block 908 and may continue to loop at block 908 while there is no new task information available to broadcast. Whether or not the task devices 103 include prestored task information, if first or new task information is to be distributed to the task devices 103, then operation proceeds to block 910 in which one or more of the transmitters 112 are instructed to broadcast the updated task information. At least one up to all of the transmitters 112 may be so instructed. Operation then loops back to block 908, and operation may loop between blocks 908 and 910 to periodically or continuously broadcast updated task information.

The updated task information may include updated task location parameters 502 to move the task area from one location to another. As an example, even a static graphic image being displayed may appear to be animated when moved about in the local area. The updated task information may include one or more updated task lists to modify the task performed within a given task area. As an example, a graphic image being displayed may be modified to simulate animation of the graphic image. The updated task information may include a combination of updated task location parameters 502 and updated task lists.

Operation may also proceed from block 906 to block 912 in which it is queried whether to update map information. If not, operation loops back to block 912 and may continue to loop at block 912 while there is no new map information available to broadcast. Whether or not the task devices 103 include prestored map information, if first or new map information is to be distributed to the task devices 103, then operation proceeds to block 914 in which one or more of the transmitters 112 are instructed to broadcast the updated map information. At least one up to all of the transmitters 112 may be so instructed. Operation then loops back to block 912, and operation may loop between blocks 912 and 914 to periodically or continuously broadcast updated map information.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. Embodiments disclosed relate to tasks associated with a crowd, such as illumination of lights or sounds and the like. The task device may be used for other applications, such as mounted on vacuum cleaners in which the task includes activating a vacuum cleaner when located in areas to be cleaned, or mounted on grass mowers in which the task includes activation of a mower when located in areas to be mowed, or mounted on agricultural vehicles the perform different agricultural tasks in different areas or locations, etc.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A task device, comprising:
communication circuitry that is configured as receive-only to receive timing information and position information from external sources;
a memory that is configured to store task information comprising a plurality of task location parameters which define a task area comprising a plurality of subblocks and a plurality of task values including a task value for each of the plurality of subblocks;
a controller that is configured to use the timing information and the position information to periodically determine and update a location metric identifying a location of the task device, to compare the location metric with the task area for determining whether the task device is located within the task area, and to access the memory to retrieve a corresponding task value when the task device is located within the task area; and
output circuitry that performs a task when indicated by the corresponding task value.

2. The task device of claim 1, wherein the timing information comprises a plurality of timestamps received from a plurality of external transmitters located at different positions of a local area, and wherein the position information identifies a position of each of the plurality of transmitters, and wherein the controller uses the plurality of timestamps and the position information to perform a location method to determine the location metric.

3. The task device of claim 2, wherein the location method comprises trilateration.

4. The task device of claim 1, wherein the plurality of task location parameters defines a location and size of the task area and defines a size and location of each of the plurality of subblocks within the task area.

5. The task device of claim 1, wherein the task information comprises a task list that identifies each of the plurality of subblocks and that provides a task value for each of the plurality of subblocks.

6. The task device of claim 1, wherein the task information is received by the communication circuitry from at least one external transmitter for storage into the memory.

7. The task device of claim 1, wherein the output circuitry comprises a plurality of light emitting devices of different colors, and wherein at least one of the plurality of task values is used by the controller to activate at least one selected light emitting device at a selected intensity.

8. The task device of claim 1, wherein the plurality of subblocks is mapped within the task area comprising a selected one of two-dimensional space and three-dimensional space.

9. The task device of claim 1, wherein the communication circuitry comprises ultra-wide band radio technology.

10. The task device of claim 1, wherein the memory further stores map information of a local venue, and wherein the controller is configured to map the location of the task device with selected map information and to activate the output circuitry to facilitate navigation of the local venue.

11. The task device of claim 1, wherein the memory further stores map information of a local venue, and wherein the communication circuitry further comprises local wireless transceiver technology for pairing with an external device for sharing the map information and the location of the task device.

12. The task device of claim 1, wherein the output circuitry comprises at least one light source, a speaker, and a vibration device, and wherein the task comprises a plurality of tasks including activating the at least one light source, playing a sound on the speaker, and activating the vibration device.

13. A method of performing a plurality of tasks based on location, comprising:
synchronizing a plurality of transmitters in time wherein the plurality of transmitters are distributed at positions in a local area; and
activating each of the plurality of transmitters to periodically broadcast timing information and position information in the local area to enable each of a plurality of task devices located in the local area to receive and use the timing information and the position information to determine a location, to determine whether the determined location is located in a task area, and to perform a specified one of a plurality of tasks based on the determined location when located in the task area;
communicatively coupling the plurality of transmitters to a central controller that coordinates a plurality of tasks performed by a corresponding plurality of task devices located in the task area;
distributing, by the central controller, task information to each of the plurality of transmitters for broadcasting to the plurality of task devices, wherein the task information comprises a plurality of task location parameters and a task list, wherein the plurality of task location parameters define the task area and a plurality of subblocks distributed within the task area, wherein the task list comprises a plurality of task values including a task value for each of the plurality of subblocks, and wherein each task value identifies a task to be performed at a corresponding subblock within the task area.

14. The method of claim 13, wherein the activating comprises activating each of the plurality of transmitters to periodically broadcast timing information comprising a plurality of timestamps and to periodically broadcast position information that identifies a position of a corresponding one of the plurality of transmitters.

15. The location and task performance system of claim 13, wherein the plurality of task location parameters defines a location and size of the task area and defines a size and location of each of the plurality of subblocks within the task area.

16. The method of claim 13 where the plurality of task devices located in the local area do not transmit information in receiving and using the timing information and the position information to determine a location, to determine whether the determined location is located in a task area, or to perform a specified one of a plurality of tasks based on the determined location when located in the task area.

17. A method of performing a plurality of tasks based on location, comprising:
synchronizing a plurality of transmitters in time wherein the plurality of transmitters are distributed at positions in a local area; and
activating each of the plurality of transmitters to periodically broadcast timing information and position information in the local area to enable each of a plurality of task devices located in the local area to receive and use the timing information and the position information to determine a location, to determine whether the determined location is located in a task area, and to perform a specified one of a plurality of tasks based on the determined location when located in the task area;
instructing at least one of the plurality of transmitters to broadcast task information comprising a plurality of task location parameters and a task list to enable each of the plurality of task devices located in the local area to receive and use the task location parameters to identify the location of the task area and to receive and use the task list to determine which of the plurality of tasks to perform.

18. The method of claim 17, wherein the plurality of task location parameters define the task area and define a plurality of subblocks distributed within the task area, wherein the task list comprises a plurality of task values including a task value for each of the plurality of subblocks, and wherein each task value identifies a task to be performed at a corresponding subblock within the task area.

19. The method of claim 17, wherein the activating enables a subset of the plurality of task devices distributed within the task area to turn on at least one light source so that the plurality of task devices located in the task area collectively display a predetermined graphic image.

20. The method of claim 17, further comprising communicatively coupling the plurality of transmitters to a central controller that coordinates a plurality of tasks performed by a corresponding plurality of task devices located in the task area.

21. The method of claim 20, further comprising distributing, by the central controller, task information to each of the plurality of transmitters for broadcasting to the plurality of task devices, wherein the task information comprises a plurality of task location parameters and a task list, wherein the plurality of task location parameters define the task area and a plurality of subblocks distributed within the task area, wherein the task list comprises a plurality of task values including a task value for each of the plurality of subblocks, and wherein each task value identifies a task to be performed at a corresponding subblock within the task area.

22. The method of claim 17 where the plurality of task devices located in the local area do not transmit information in receiving and using the timing information and the position information to determine a location, to determine whether the determined location is located in a task area, or to perform a specified one of a plurality of tasks based on the determined location when located in the task area.

* * * * *